United States Patent
Neumann et al.

(10) Patent No.: US 9,303,195 B2
(45) Date of Patent: Apr. 5, 2016

(54) ALIPHATICALLY MODIFIED ROSIN RESIN AND TACKIFIED ADHESIVE

(71) Applicant: MeadWestvaco Corporation, Richmond, VA (US)

(72) Inventors: Brett A. Neumann, Mount Pleasant, SC (US); John C. Widders, Mount Pleasant, SC (US); Russ N. Fitzgerald, Mount Pleasant, SC (US)

(73) Assignee: Ingevity South Carolina, LLC, North Charleston, SC (US)

( * ) Notice: Subject to any disclaimer, the term of this patent is extended or adjusted under 35 U.S.C. 154(b) by 29 days.

(21) Appl. No.: 14/468,482

(22) Filed: Aug. 26, 2014

(65) Prior Publication Data

US 2016/0060495 A1    Mar. 3, 2016

(51) Int. Cl.
*C09J 193/04*     (2006.01)
*C08J 3/24*       (2006.01)
*C09J 123/06*     (2006.01)

(52) U.S. Cl.
CPC  *C09J 193/04* (2013.01); *C08J 3/24* (2013.01); *C09J 123/06* (2013.01); *C08J 2323/06* (2013.01); *C08J 2393/04* (2013.01); *C08J 2423/06* (2013.01); *C08J 2493/04* (2013.01)

(58) Field of Classification Search
CPC .......... C09J 196/04; C09J 193/06; C09J 3/24; C09J 2393/04; C09J 2493/04; C09J 2323/06; C09J 2423/06
See application file for complete search history.

(56) References Cited

U.S. PATENT DOCUMENTS 4,751,025 A * 6/1988 Olechowski .............. C09F 1/04
530/214

* cited by examiner

*Primary Examiner* — Robert Jones, Jr.
(74) *Attorney, Agent, or Firm* — Bryan D. Zerhusen; Locke Lord LLP

(57) ABSTRACT

Aliphatically modified rosin resins are prepared by reacting rosin esters with aliphatic monomers. These aliphatically modified rosin resins are compatible with metallocene catalyzed polyolefins and other aliphatic base polymers and are used as tackifiers in combination with metallocene catalyzed polyolefins and other aliphatic base polymers to form adhesive compositions for hot melt and pressure sensitive applications.

21 Claims, No Drawings

ALIPHATICALLY MODIFIED ROSIN RESIN AND TACKIFIED ADHESIVE

FIELD OF THE INVENTION

The present invention relates to: aliphatically modified rosin resins and their method of production; the use of aliphatically modified resins as tackifiers in adhesive compositions; and the adhesive compositions produced thereby.

BACKGROUND OF THE INVENTION

A need presently exists for improved tackifying resins for use in thermoplastic adhesives formed of metallocene catalyzed polyolefins and other aliphatic base polymers.

Until somewhat recently, hot melt adhesives (HMAs) formed of ethylene vinyl acetate (EVA) were predominantly used in the packaging industry and in other applications. However, the introduction of metallocene catalyzed polyolefin elastomers in the late 1990s led to the development of new HMAs which are superior to the EVA-based adhesives in both their machineability and in their relative oxidation resistance and clarity.

Adhesives formed of metallocene catalyzed polyolefin elastomers and other aliphatic base polymers are used, for example, for packaging (e.g., case or carton sealing, flexible packaging, etc.), product assembly applications, and pressure sensitive applications. The metallocene polymers can provide improved thermal stability at high and low temperatures, improved processability, machineability, reduced crystallinity, lower color, and lower molecular weight.

As with other hot melt and pressure sensitive polymer adhesives compositions, the aliphatic polymer based adhesive formulations also include tackifying resins which increase the adhesion (i.e., the ability of the adhesive to form a lasting bond) of the adhesive to the substrate. These tackifiers tend to have low molecular weights (relative to the base polymer), as well as glass transition and softening temperatures above room temperature, which give the tackifiers unique amorphous properties. Tackifiers frequently account for a significant portion of the weight of a hot melt adhesive product as they can comprise up to 50% or more of the total mass of the product.

Heretofore, rosin ester tackifiers or oligomers have been successfully used to improve the adhesion properties of various polymer adhesive compositions. Unfortunately, however, these rosin ester tackifiers have not been compatible with metallocene catalyzed polyolefins and other aliphatic base polymers. When blended with these polymers, the blended system turns opaque white and forms separate microphases which separate very quickly. Fundamentally, the use of rosin ester tackifiers in metallocene polymer compositions has been limited due to the composition and structure of the ester as well as the disproportionation reactions which occur when the rosin is heated to a temperature above 230° C. During the disproportionation step of the rosin, either thermally or in the presence of a disproportionation catalyst, the isomers of rosin convert from the typical abeitic, palustric, and neoabietic types to more stable dehydroabietic isomers. These isomers, with their terminal fused aromatic ring structure increase the polarity of the resin which furthers the rosin esters incompatibility with the aliphatic base polymer.

Consequently, heretofore, the tackifying resin materials used in metallocene catalyzed polyolefin and other aliphatic base polymer compositions have been hydrogenated hydrocarbon tackifiers or oligomers. In comparison to rosin ester tackifiers, these hydrogenated hydrocarbon resins, when formulated into typical adhesives, have higher melt viscosities, and reduced formulation latitude. Moreover, and more importantly, the hydrogenated hydrocarbon resins have less robust adhesion characteristics as compared to rosin ester tackifiers when evaluated in similar formulations.

Therefore, in view of the above, it will be apparent that a need exists for: (a) an improved tackifying resin for metallocene catalyzed polyolefins and other aliphatic base polymers; (b) a rosin ester tackifier composition which is compatible with metallocene catalyzed polyolefins and other aliphatic base polymers; and (c) an improved metallocene catalyzed polyolefin adhesive composition comprising the new rosin ester tackifier composition.

SUMMARY OF THE INVENTION

The present invention satisfies the needs and alleviates the problems discussed above.

In one aspect, there is provided a method of producing an aliphatically modified rosin resin. In another aspect, there is provided an aliphatically modified rosin resin product produced by the inventive method. The method preferably comprises the steps of: (a) esterifying rosin by reaction with a polyol to produce a rosin polyol ester and (b) reacting the rosin polyol ester with a monomer material to produce the aliphatically modified rosin resin. The monomer material is preferably selected from: $C_6$ to $C_{22}$ alpha-olefins; vinyl-terminated monomers; $C_6$ to $C_{22}$ alpha-beta unsaturated esters and acids; fumaric, maleic, or acrylic esters or diesters of $C_4$ to $C_{22}$ aliphatic chains or rings; and combinations thereof.

In another aspect, there is provided a thermoplastic adhesive composition comprising: an aliphatic base polymer material, a waxy diluent, and an aliphatically modified rosin resin. The aliphatically modified rosin resin is preferably produced by (a) esterifying rosin by reaction with a polyol to produce a rosin polyol ester and (b) reacting the rosin polyol ester with a monomer material to produce the aliphatically modified rosin resin. The monomer material is preferably selected from: $C_6$ to $C_{22}$ alpha-olefins; vinyl-terminated monomers; $C_6$ to $C_{22}$ alpha-beta unsaturated esters and acids; fumaric, maleic, or acrylic esters or diesters of $C_4$ to $C_{22}$ aliphatic chains or rings; and combinations thereof.

In yet another aspect there is provided a thermoplastic adhesive composition comprising: a metallocene catalyzed polyolefin and an aliphatically modified rosin resin. The aliphatically modified rosin resin is preferably produced by (a) esterifying rosin by reaction with a polyol to produce a rosin polyol ester and (b) reacting the rosin polyol ester with 1-decene or vinyl monomers, or other depending on the examples included.

Further aspects, features, and advantages of the present invention will be apparent to those of ordinary skill in the art upon reading the following Detailed Description of the Preferred Embodiments.

DETAILED DESCRIPTION OF THE PREFERRED EMBODIMENTS

The present invention provides an aliphatically modified rosin resin tackifier which is compatible with metallocene catalyzed polyolefins and other aliphatic base polymer materials. In addition, the present invention provides a method of producing the inventive aliphatically modified rosin resin tackifier. Further, the present invention provides a thermoplastic adhesive composition which preferably comprises: (a) a metallocene catalyzed polyolefin or other aliphatic base polymer material; (b) the inventive aliphatically modified rosin resin tackifier; and (c) a waxy diluent.

The inventive aliphatically modified rosin resin is preferably produced by a method comprising the steps of: (1) esterifying crude or other non-functionalized rosin by reaction with a polyol to produce a rosin polyol ester; (2) reacting the rosin polyolester with one or more monomer materials to produce the inventive aliphatically modified rosin resin; and (3) also preferably vacuum stripping the aliphatically modified rosin resin product to remove unreacted monomer and to thereby also typically increase the softening point of the inventive aliphatically modified rosin resin.

Alternatively, the inventive aliphatically modified rosin resin may be produced by the method comprising the steps of: 1) reacting rosin with one or more monomer materials in the presence of a catalyst such as Bentonite clay (F-100) or other catalyst which will assist with similar reaction pathways; 2) removing the catalyst via filtration and removing excess monomer via either atmospheric or vacuum distillation; and 3) esterifying the modified rosin by reaction with glycerin or other polyol to produce the inventive aliphatically modified rosin resin Many different polyols are known and used in the art to react with the carboxylic core of the rosin structure thus producing rosin esters. Some examples of said polyols include, but are not limited to: triethyleneglycol, diethyleneglycol, pentaerythritol, glycerol, sorbitol, trimethanolpropane, 1,4-cyclohexane dimethanol, 1,4-butanediol, 1,3-propanediol, and ethylene glycol used solely or as a combination thereof.

Esterification catalysts and stabilizers for rosin esters are known in the art. An example of an esterification catalyst preferred for use in the inventive method is phosphonic acid, P[[3,5-bis(1,1-dimethylethyl)-4-hydroxyphenyl]methyl]-, monoethyl ester, calcium salt (2:1). This composition is commercially available from Mayzo under the name BNX 1425. The esterification catalyst will preferably be present in the reaction mixture in amount in the range of from about 0.04 to about 0.4% by weight of the total mixture.

Examples of monomer materials suitable for use in the second step of the inventive method for aliphatically modifying the previously produced rosin glycerin ester include, but are not limited to: branched, cyclic, and straight chained $C_6$ to $C_{22}$ alpha-olefins; vinyl-terminated monomers; $C_6$ to $C_{22}$ alpha-beta unsaturated esters and acids; fumaric, maleic, or acrylic esters or diesters of $C_4$ to $C_{22}$ aliphatic chains or rings; and combinations thereof.

Examples of vinyl-terminated monomers preferred for use in the inventive method include, but are not limited to: branched, cyclic, or straight chained $C_6$ to $C_{22}$ vinyl ethers; ethyl vinyl ether; isobutyl vinyl ether; n-butyl vinyl ether; tert-butyl vinyl ether; cyclohexyl vinyl ether; dodecyl vinyl ether; octadecyl vinyl ether; or 2-ethyl hexyl vinyl ether. The vinyl-terminated monomers most preferred for use in the inventive method are: branched, cyclic, or straight chained $C_6$ to $C_{22}$ vinyl ethers; cyclohexyl vinyl ether; dodecyl vinyl ether; octadecyl vinyl ether; or 2-ethyl hexyl vinyl ether.

The $C_6$ to $C_{22}$ alpha-olefins preferred for use in the inventive method are branched, cyclic, or straight chained $C_{10}$ to $C_{18}$ alpha-olefins. The alpha-olefin most preferred for use in the inventive method is 1-decene.

When the aliphatic modification step of the inventive reaction method is complete or substantially complete, but before vacuum stripping, an antioxidant is preferably added to the reaction mixture. An example of a suitable antioxidant additive is pentaerythritol tetrakis(3-(3,5-di-tert-butyl-4-hydroxyphenyl)propionate). This antioxidant is commercially available from Irganox under the name INGANOX 1010 and will preferably be used in the inventive method in an amount in the range of from about 0.05% to about 0.4% by weight of the total reaction mixture.

The chemical structure of the inventive aliphatically modified rosin resin produced by the inventive reaction method is presently unknown. It is possible that the reaction which occurs between aliphatic monomer and the rosin polyol ester in the second step of the inventive method is a Diels Alder reaction wherein the monomer acts as a dienophile. Alternatively, it is possible the aliphatic monomer may instead be reacting with the carboxylate group of the rosin polyol ester or possibly with the dehydroabeitic acid isomers through a Friedel-Crafts type mechanism especially in the presence of a suitable catalyst such as Zeolite or other suitable Friedel-Crafts catalyst.

As mentioned above, the thermoplastic adhesive composition provided by the present invention preferably comprises: (b) one or more metallocene catalyzed polyolefins and/or other aliphatic base polymer materials; (b) the inventive aliphatically modified rosin resin tackifier; and (c) a waxy diluent (e.g., a Fischer-Tropsch wax or other diluent of the type used in the art for preparing hot melt or pressure sensitive thermoplastic adhesives). The metallocene catalyzed polyolefin or other aliphatic base polymer material is preferably present in the inventive adhesive composition in an amount in the range of from about 80 to about 40 parts by weight and is more preferably present in an amount in the range of from about 55 to about 40 parts by weight. The inventive aliphatically modified rosin resin tackifier is preferably present in the inventive adhesive composition in an amount in the range of from about 20 to about 60 parts by weight and is more preferably present in an amount in the range of from about 45 to about 60 parts by weight.

In addition to metallocene catalyzed polyolefins, examples of other aliphatic base polymer materials suitable for use in the inventive thermoplastic adhesive composition include, but are not limited to: amorphous poly alpha olefins, polybutene polymers, atactic polypropylene, polyethylene resins, hydrogenated rubber polymers, or a combination thereof.

The base polymer material used in forming the inventive thermoplastic adhesive composition will preferably be one or more metallocene catalyzed polyolefins. The metallocene catalyzed polyolefin(s) can be any metallocene catalyzed polyolefin product(s) known for or otherwise suitable for use in thermoplastic adhesive applications. Examples of such metallocene catalyzed polyolefin products include, but are not limited to, AFFINITY polyolefins and ENGAGE polyolefins which are available from Dow Chemical, Vistamaxx from ExxonMobil, and LICOCENE which is available from Clariant.

By way of example, but not by way of limitation, the inventive thermoplastic adhesive composition can be prepared by adding the composition components, preferably one at a time, to a heated mixing vessel, preferably with a full sized agitator, under a nitrogen atmosphere. Preferably, the waxy diluent will be added to the mixing vessel first, followed by the inventive aliphatically modified rosin resin tackifier (which has preferably been vacuum stripped) and then by the metallocene catalyzed polyolefin(s) and/or other aliphatic base polymer(s).

The components of the inventive adhesive composition will preferably be mixed until a smooth, clear, homogeneous blend is formed. The material can then, for example, be removed from the mixing vessel and extruded or otherwise processed to form chips or pellets. These product chips or pellets can be used, for example, in hot melt adhesive applications by adding the chips or pellets to a hot melting tank and pumping the melted product through a nozzle for application of the material to the surface of any type of article, item or structure. The surface of a second article, item, or structure is then pressed against or otherwise applied the treated surface of the first article to thereby bond the second article to the first article.

Although the chemical structure of the aliphatically modified rosin resin product provided by the present invention has not yet been determined, the inventive product, as formed by the inventive production method, is highly compatible with metallocene catalyzed polyolefins and other aliphatic base polymers to produce stable, smooth, and clear compositions wherein phase separation does not occur. As compared to the tackifiers used heretofore with metallocene catalyzed polyolefins, the inventive aliphatically modified rosin resin also provides lower melt viscosities, higher specific adhesion properties, and better heat resistance.

Moreover, these results for the inventive aliphatically modified rosin resin are surprising and unexpected. To our knowledge, these are the first rosin ester based compounds which have been discovered to be compatible with metallocene catalyzed polyolefins. Typical rosin ester tackifiers are not compatible with metallocene catalyzed polyolefins. Nor are blends comprising the prior rosin ester tackifiers mixed with alpha-olefins. To our knowledge, prior efforts to add hydrocarbons to rosin ester tackifiers to produce products which would be compatible with metallocene catalyzed polyolefins also have not been successful.

The following examples are intended to illustrate, but in no way limit, the invention as claimed.

Example 1

To a 3 L four-neck round bottom flask equipped with an air driven agitator, condenser, nitrogen sparge tube, and thermocouple was added MWV rosin (1418.72 g, 4.68 mol). The solid rosin was heated to 180° C. under a nitrogen blanket to melt followed by the addition of Irganox 1425 (5.6 g, 0.008 mol) and Lowinox TBM-6 (4.48 g, 0.013 mol). After heating to 200° C., glycerin (167.2 g, 1.82 mol) was added. The mixture was heated to 270° C. over 4 h and stirred with a nitrogen sparge until an acid number value of 15 mg KOH/g or below was reached. The temperature was decreased to 180° C. and Irganox® 1010 (4.0 g, 0.003 mol) was added. After stirring for 5 min the mixture was poured to provide resin product with typical properties such as Gardner color of 4 (neat), acid number value of <11, and softening point of 86° C.

Example 2

To a 5 L four-neck round bottom flask equipped with an air driven agitator, condenser, nitrogen sparge tube, and thermocouple was added MWV rosin (2674.2 g, 8.83 mol). The solid rosin was heated to 180° C. to melt followed by the addition of BNX® 1425 (10.79 g, 0.016 mol) and glycerin (315 g, 3.42 mol). The mixture was heated to 275° C. over 2 h and nitrogen sparging was initiated. The reaction was stirred for an additional 4.5 h with nitrogen sparging before it was cooled to 180° C. and poured to provide a resin with a Gardner color of 4.7 (neat), an acid number value of 6.3 mg KOH/g, and a softening point of 90° C.

The glycerin ester resin (249.38 g) was placed in a 500 mL round bottom flask equipped with an air driven agitator, condenser, distillation trap, nitrogen sparge tube, and thermocouple. The ester was heated to 250° C. and Irganox® 1010 (0.65 g, 0.0006 mol) was added. Vacuum (−800 mbar) was applied and the mixture was stirred for 1 h with a slight nitrogen sparge. The temperature was increased to 275° C. and held for an additional 40 min before cooling to 180° C. The resin was poured to provide a resin product with a Gardner color of 4.9 (neat), an acid number value of 3 mg KOH/g, and a softening point of 93.3° C.

Example 3

To a 3 L four-neck round bottom flask equipped with an air driven agitator, condenser, nitrogen sparge tube, and thermocouple was added MWV rosin (1157.3 g, 3.82 mol). The solid rosin was heated to 180° C. to melt followed by the addition of BNX® 1425 (4.66 g, 0.007 mol), and glycerin (136.32 g, 1.48 mol). The mixture was heated to 250° C. and stirred with a nitrogen sparge for 2 h. The temperature was increased to 275° C. and the mixture was stirred for an additional 4 h with a nitrogen sparge. The reaction was cooled to 180° C. and held overnight under a nitrogen blanket.

Acid number analysis the next day revealed a value of 11 mg KOH/g. The temperature of the molten mixture was reduced to 170° C. and 1-decene (297.3 g, 2.12 mol) was added. After the solution was stirred at 170° C. for five hours, Irganox® 1010 (3.2 g) was added and the temperature was gradually increased to 220° C. to remove excess 1-decene. The resin was cooled to 180° C. and poured. To ensure all excess 1-decene was removed the solid was re-melted at 220° C. and vacuum was applied (−956 mbar vacuum). The molten resin was gradually heated to 240° C. under vacuum (−956 mbar) and stripped until no further distillation was observed (typically 1 h total time under vacuum). The mixture was cooled to 180° C. and released from vacuum with nitrogen. The resin was poured and cooled to provide the inventive product with a Gardner color of 5.6 (neat), an acid number value of 7 mg KOH/g, and a softening point of 89.6° C.

Example 4

To a 1 L four-neck round bottom flask equipped with an air driven agitator, condenser, nitrogen sparge tube, and thermocouple was added MWV rosin (400 g, 1.32 mol). The solid rosin was heated to 180° C. to melt and 1-decene (200 g, 1.43 mol) was added. Bentonite clay (F-100) (16 g) was added and the suspension was stirred at 170° C. for 1.5 h before heating to 180° C. and stirring an additional 3.5 h. The reaction was cooled to 160° C. and held overnight. The next day, the temperature was increased to 180° C. and stirring was continued for an additional 6.5 h. The mixture was poured into a tin pan and allowed to cool. The dark residue was dissolved in toluene (200 mL) at 100° C. The solution was cooled to 50° C. and filtered through a bed of Celite® using toluene (50 mL) to wash the Celite® bed. The slightly hazy solution was filtered through whattman #2 filter paper to provide a clear solution. The toluene and excess 1-decene were removed via atmospheric distillation (maximum temperature at 250° C.) and the resultant resin was poured to cool. 319 g of modified rosin was isolated with an acid number value of 145 mg KOH/g and a softening point of 58° C.

300.79 g of the modified rosin was placed in a 500 mL four-neck round bottom flask equipped with an air driven agitator, condenser, nitrogen sparge tube, and thermocouple. The temperature was increased to 180° C. to melt the resin. To the molten mixture was added BNX® 1425 (1.14 g, 0.002 mol), Rosinox™ (0.65 g), and glycerin (21.61 g, 0.23 mol). The mixture was heated to 250° C. with a nitrogen sparge for 3.5 h and then the temperature was increased to 275° C. for an additional 2 h before cooling to 180° C. for overnight holding.

The next day, additional glycerin (10.8 g, 0.12 mol) was added and the mixture was heated to 250° C. After stirring for 4.5 h at 250° C. with a nitrogen sparge, the resin was cooled to 180° C. Irganox® 1010 (0.79 g, 0.0007 mol) was added and the mixture was stirred for 10 min. The resin was poured and cooled to provide the inventive product with an acid number value of 8.7 mg KOH/g, and a softening point of 80° C.

Compatibility Analysis Via Visual Clarity for Metallocene Compatible Tackifiers

Compatibility of Rosin-based tackifiers with Metallocene catalyzed polymers for adhesive applications has long been questioned. Judging the relative or absolute compatibility can be performed by characterizing the relative initial and aged melt clarity of a formulation at standard temperature (350° F.). This test protocol used molten optical clarity, in a manner similar to an ink or coating being applied and dried over Laneta paper. In the case of an ink or paint, the relative hiding power (the opposite of clarity) is characterized. In this determination, we observe and rate the clarity of the molten subject against multiple backgrounds, assigning a ranking for clarity against an indigo blue background, a medium purple background with white block print lettering and a white background with fine lined black characters.

This was a timed evaluation that required a minimum of 96 hours, with daily observations at 24 hour intervals. It was recommended that this testing begin on a Monday morning, which allowed for completion of the observation without incurring weekend work time. All Hot Melt adhesive formulas to be tested were prepared in advance, under standard conditions with standard equipment, or as required. Upon completion of the batch, 60 mL test tube was filled with 45 to 50 grams or approximately one inch below the top of the test tube. This allowed space for the silicone stopper to be placed and also provided for approximately ¼ inch of head space.

Test Tube Filling Protocol Used when not Making a Batch:
1. Heat all samples to be tested in a 350 F oven. Heat for at least one hour; possibly longer if there are more than three samples to be evaluated.
2. Place a clean 60 mL glass test tube in a narrow mouth jar, allowing it to stand as upright as possible.
3. Mark either the test tube or jar, to identify each sample.
4. Pour one sample, heated to 350° F. in a metal paint can, into a 60 mL glass test tube. Repeat for each sample.
5. Fill with approximately 45 to 50 grams of material, or enough until the level of material is approximately 1 inch from the top.
6. Immediately stopper the test tube. There should now be approximately ¼ to ½ inch head space in the sealed test tube.
7. Place the test tube & jar into a pre-heated oven and allow to heat for one hour.

Color Determination Protocol Used:
1. Orient the background to form a 90 degree angle to the work surface upon which it is rested. Position the background so that the dark blue colored portion is closest to the work surface and the white portion is the furthest away from the work surface.
2. After all samples are fully molten, remove one sample at a time, gripping with either small tongs and/or a heat resistant glove; and immediately rest against our color backdrop
3. Place test tube as close to the color backdrop as possible and IMMEDIATELY:
4. Assess the clarity via the following criterion.
   a. If the dark blue color is clearly visible, rate the sample as at least a 1.0 and continue with b below
      i. If the blue color is not clearly visible rate the sample a 1.0 and suspend the evaluation.
   b. Immediately assess the clarity against the purple background. If the white lettering is visible, rate the sample as a 2.0 and continue to c below
      i. If the purple color and white lettering is NOT visible, rate the sample as a 2.0- and return to the oven.
   c. Immediately assess the clarity against the white background with black lettering. If the lettering is visible, rate the sample as a 3.0.
      i. If the white color and black lettering are visible but not distinguishable, rate the sample as a 3.0—and proceed to #4 below.
5. After each sample has been characterized, put each sample back into the oven and repeat the evaluation every 24 hours, until 96 hours have passed.
6. NOTE: Each sample can be rated as a "+", in addition to their numerical grade, if it displays exceptional clarity in which the script (either block white or fine lined black) is VERY clearly legible.

The viscosity of each adhesive was taken using a DV-I Prime Brookfield Viscometer and thermosel with a #27-spindle. Viscosity was reported in centipoise (CPS). Viscosities were recorded at 350° F. Mettler Dropping Point was determined using a DP-90 Dropping Point unit.

PAFT (Peel Adhesion Failure Temperature) and SAFT (Shear Adhesion Failure Temperature) values were generated using 40 lb Kraft recycled paper as the test substrate. The bonded area was 1"×1" and the adhesive film thickness was approximately 18-20 mils. 100 gram weights were used for the PAFT and SAFT testing. Five samples of each were tested and the failure temperatures were averaged. The samples were run in an oven programmed to increase 1° C. per minute from a starting temperature of 40° C.

Open Time and Set Speed comparisons were conducted by heat reactivating 18-20 mil films of the adhesive at 350° F. for two minutes. A film of each adhesive was placed 2.5 inches apart on 20 lb. bond paper attached to a backing board and heated at 350° F. for 2 minutes. After two minutes the samples were taken out of the oven and another piece of 20 lb. bond paper was placed on the molten adhesive surface and compression was provided with a roller that weighed 4946 grams. Once compressed, the top paper was peeled back against itself. Open time was observed when the adhesive material ceased to transfer and Set Speed was noted when the paper fiber was torn.

Adhesion (bonding) was tested using a Rock-Tenn Bond Simulator to apply an approximately ⅛" wide bead to the surface of a substrate at 350° F. The glue gun pressure was 55 PSI. The glue tank pressure was 50 PSI. The machine speed was 100 ft/min and the dwell time was 1 second before 0.5 seconds of compression at 10 PSI. The samples were exposed to various temperatures overnight and then pulled apart at the exposure temperature. Fiber tear was recorded. Five samples were tested for each condition and the average fiber tear was reported. Fiber tear was generated by physically debonding the samples and observing the percentage of fiber tear along the glue line.

The paper substrates used in the adhesion (bonding) tests were:
Carrier Kote®: an unbleached, coated kraft paperboard which remains strong when wet.
99% recycled corrugated board.
Printkote®: a bright white, glossy paperboard designed to laminate to single-faced corrugated board.

Nomar® 70AFN: a water based, non-abrasive coating generally used to provide abrasion protection for gas flushed food packaging or small appliances.

TABLE 1

Formulas for Resin/Polymer Compatibility Testing
Formulas For Resin-Polymer Compatibility Testing

| Raw Material | Trade Name | Adhesive Sample ID | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Hydrogenated Hydrocarbon Control | Eastotac H-100 W | 40 | | | | | | 30 | | | | 30 | | | |
| Hydrogenated DCPD Control | Escorez 5400 | | 40 | | | | | | 30 | | | | 30 | | |
| Example 1 Resin | Example 1 | | | 40 | | | | | | | | | | 30 | |
| Example 2 Resin | Example 2 | | | | 40 | | | | | | | | | | 30 |
| Example 3 Resin | Example 3 | | | | | 40 | | | | 30 | | | | | |
| Example 4 Resin | Example 4 | | | | | | 40 | | | | 30 | | | | |
| Metallocene Catalyzed Polyolefin Elastomer | Affinity GA 1900 | 40 | 40 | 40 | 40 | 40 | 40 | | | | | | | | |
| Polyethylene Homopolymer | Epolene C-10 | | | | | | | 60 | 60 | 60 | 60 | | | | |
| Metallocene Catalyzed Propylene-Ethylene-copolymer | Licocene PP 1502 | | | | | | | | | | | 70 | 70 | 70 | 70 |
| Fischser Tropsch Wax | Sasolwax H-1 | 20 | 20 | 20 | 20 | 20 | 20 | 10 | 10 | 10 | 10 | | | | |
| Total | | 100 | 100 | 100 | 100 | 100 | 100 | 100 | 100 | 100 | 100 | 100 | 100 | 100 | 100 |

TABLE 2

Resin Polymer Compatibility Testing Results
Resin-Polymer Compatibility Testing Results

| Sample ID | Test Resin | Base Polymer | Reheated Clarity Scale (1 to 3) Reheated and Kept at 350° F. | | | | |
|---|---|---|---|---|---|---|---|
| | | | 60 Minutes | 24 Hours | 48 Hours | 72 Hours | 96 Hours |
| 1 | Hydrogenated Hydrocarbon Control | Metallocene Catalyzed Polyolefin Elastomer | 3+ | 3+ | 3+ | 3+ | 3+ |
| 2 | Hydrogenated DCPD Control | Metallocene Catalyzed Polyolefin Elastomer | 3+ | 3+ | 3+ | 3+ | 3+ |
| 3 | Example 1 | Metallocene Catalyzed Polyolefin Elastomer | 2− | 2− | 2− | Test Stopped | Test Stopped |
| 4 | Example 2 | Metallocene Catalyzed Polyolefin Elastomer | 2 | 2 | 2− | Test Stopped | Test Stopped |
| 5 | Example 3 | Metallocene Catalyzed Polyolefin Elastomer | 3 | 3 | 3+ | 3+ | 3+ |
| 6 | Example 4 | Metallocene Catalyzed Polyolefin Elastomer | 3+ | 3+ | 3+ | 3+ | 3+ |
| 7 | Hydrogenated Hydrocarbon Control | Polyethylene Homopolymer | 3+ | 3+ | 3+ | 3+ | 3+ |
| 8 | Hydrogenated DCPD Control | Polyethylene Homopolymer | 3+ | 3+ | 3+ | 3+ | 3 |
| 9 | Example 3 | Polyethylene Homopolymer | 3+ | 3+ | 3+ | 3+ | 3+ |
| 10 | Example 4 | Polyethylene Homopolymer | 3+ | 3+ | 3− | 3− | 3− |
| 11 | Hydrogenated Hydrocarbon Control | Metallocene Catalyzed Propylene-Ethylene-copolymer | 3+ | 3+ | 3+ | 3+ | 3+ |
| 12 | Hydrogenated DCPD Control | Metallocene Catalyzed Propylene-Ethylene-copolymer | 3+ | 3+ | 3− | 3− | 3− |
| 13 | Example 3 | Metallocene Catalyzed Propylene-Ethylene-copolymer | 3 | 3− | 3− | 3− | 3− |
| 14 | Example 4 | Metallocene Catalyzed Propylene-Ethylene-copolymer | 3+ | 3+ | 3+ | 3+ | 3+ |

TABLE 3

Adhesive Formulations for Performance Testing

| Sample ID | C5 Hydrocarbon Control Adhesive #1 | Example 3 Adhesive #1 | Example 4 Adhesive #1 | C5 Hydrocarbon Control Adhesive #2 | Example 3 Adhesive #2 | Example 4 Adhesive #2 |
|---|---|---|---|---|---|---|
| Affinity AG-1900 | 21 | 21 | 21 | 22 | 22 | 22 |
| Affinity AG-1950 | 21 | 21 | 21 | 20 | 20 | 20 |
| Sasolwax H-1 | 20 | 20 | 20 | 20 | 20 | 20 |
| Irganox 1010 | 0.5 | 0.5 | 0.5 | 0.5 | 0.5 | 0.5 |
| Escorez 5637 | 27.5 | 27.5 | 27.5 | | | |
| Eastotack H-100 W | 10 | | | 37.5 | | |
| Example 3 Resin | | 10 | | | 37.5 | |
| Example 4 Resin | | | 10 | | | 37.5 |
| Total | 100 | 100 | 100 | 100 | 100 | 100 |

TABLE 4

Performance Testing

| Sample ID | C5 Hydrocarbon Control Adhesive #1 | Example 3 Adhesive #1 | Example 4 Adhesive #1 | C5 Hydrocarbon Control Adhesive #2 | Example 3 Adhesive #2 | Example 4 Adhesive #2 |
|---|---|---|---|---|---|---|
| HC Resin Replacement Level | NA-Control | 21.50% | 21.50% | NA-Control | 100% | 100% |
| Viscosity (CPS) @ 350° F. | 1,015 | 1,115 | 1,095 | 927 | 815 | 835 |
| Batch Information | | | | | | |
| Color (Gardner) | −0.4 | 3.1 | 3.8 | −0.4 | 4.1 | 5 |
| Softening Point (° C.) | 106.9 | 108 | 107.3 | 106.1 | 107.2 | 107.4 |
| Heat Resistance (° F.) | | | | | | |
| PAFT | 160 | 158 | 160 | 135 | 131 | 134 |
| SAFT | 226 | 228 | 228 | 221 | 223 | 225 |
| Tack Down (Rate of Set) | | | | | | |
| Open Time | Control | Longer | Similar | Control | Similar | Similar |
| Set Speed | Control | Slightly Slower | Similar | Control | Similar | Similar |

The viscosities of the inventive adhesive test formulations were comparable. All formulations fell within the typical range for a general purpose packaging adhesive. Also, the open time and set speed of the inventive formulations were consistent with one another and were suitable for many packaging applications. Further, the inventive resins which include Example 3 Adhesive #1 through Example 3 Adhesive#2 offered PAFT heat resistance and SAFT shear adhesion failure temperatures which were in line with the hydrocarbon control.

TABLE 5

| Sample ID | C5 Hydrocarbon Control Adhesive #1 | Example 3 Adhesive #1 | Example 4 Adhesive #1 | C5 Hydrocarbon Control Adhesive #2 | Example 3 Adhesive #2 | Example 4 Adhesive #2 |
|---|---|---|---|---|---|---|
| HC Resin Replacement Level | NA-Control | 21.50% | 21.50% | NA-Control | 100% | 100% |
| 99% Recycled Corrugate | 100 | 100 | 100 | 100 | 100 | 100 |
| Carrier Kote ® | 100 | 100 | 100 | 100 | 100 | 100 |
| Printkote ® | 100 | 100 | 100 | 100 | 100 | 100 |
| Michelman Nomar 70 | 0 | 17 | 13 | 8 | 60 | 72 |

Adhesion Testing (% Fiber Tear)

The inventive resins in Example 3 and 4 showed equivalent performance to the hydrocarbon control samples on 99% recycled corrugate and Carrier Kote®.

Most importantly, on the more challenging Michelman Nomar 70 coated corrugate substrate, the inventive compositions of Example 3 and 4 produced moderate levels of fiber tear whereas the control sample produced almost no adhesion or fiber tear, thus showing that the functionality of the inventive rosin resin provides enhanced adhesion performance.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. A method of producing an aliphatically modified rosin resin comprising the steps of:
   esterifying a rosin by reaction with a polyol to produce a rosin polyol ester and
   reacting said rosin polyol ester with a monomer material to produce said aliphatically modified rosin resin,
   wherein said monomer material is selected from: $C_6$ to $C_{22}$ alpha-olefins; vinyl-terminated ether monomers; $C_6$ to $C_{22}$ alpha-beta unsaturated esters and acids; fumaric, maleic, or acrylic esters or diesters of $C_4$ to $C_{22}$ aliphatic chains or rings; and combinations thereof.

2. The method of claim 1 wherein said rosin is reacted with said polyol in step (a) in the presence of a catalyst effective for 4+2 additions and other electrophilic substitutions.

3. The method of claim 2 wherein said catalyst is bentonite clay (F-100).

4. The method of claim 1 wherein said monomer material is a $C_6$ to $C_{22}$ alpha-olefin.

5. The method of claim 1 wherein said monomer material is 1-decene.

6. The method of claim 1 wherein said monomer material is a branched, cyclic, or straight chained $C_6$ to $C_{22}$ vinyl ether.

7. The method of claim 1 wherein said monomer material is ethyl vinyl ether, isobutyl vinyl ether, n-butyl vinyl ether, tert-butyl vinyl ether, cyclohexyl vinyl ether, dodecyl vinyl ether, octadecyl vinyl ether, or 2-ethyl hexyl vinyl ether.

8. An aliphatically modified rosin resin produced by the method of claim 1.

9. An aliphatically modified rosin resin produced by the method of claim 2.

10. An aliphatically modified rosin resin produced by the method of claim 3.

11. An aliphatically modified rosin resin produced by the method of claim 4.

12. An aliphatically modified rosin resin produced by the method of claim 5.

13. An aliphatically modified rosin resin produced by the method of claim 6.

14. An aliphatically modified rosin resin produced by the method of claim 7.

15. A thermoplastic adhesive composition comprising an aliphatic base polymer material and an aliphatically modified rosin resin produced by (a) esterifying a rosin by reaction with a polyol to produce a rosin polyol ester and (b) reacting said rosin polyol ester with a monomer material to produce said aliphatically modified rosin resin, wherein said monomer material is selected from: $C_6$ to $C_{22}$ alpha-olefins; vinyl-terminated ether monomers; $C_6$ to $C_{22}$ alpha-beta unsaturated esters and acids; fumaric, maleic, or acrylic esters or diesters of $C_4$ to $C_{22}$ aliphatic chains or rings; and combinations thereof.

16. The thermoplastic adhesive composition of claim 15 wherein said aliphatic base polymer material comprises one or more metallocene catalyzed polyolefins, one or more amorphous poly alpha olefins, atactic polypropylene, one or more polyethylene resins, one or more hydrogenated rubber polymers, or a combination thereof.

17. The thermoplastic adhesive composition of claim 16 wherein said aliphatic base polymer material is present in said thermoplastic adhesive composition in an amount of from about 40 to about 80 parts by weight and said aliphatically modified rosin resin is present in said thermoplastic adhesive composition in an amount of from about 20 to about 60 parts by weight.

18. A thermoplastic adhesive composition comprising a metallocene catalyzed polyolefin and an aliphatically modified rosin resin produced by (a) esterifying a rosin by reaction with glycerin to produce a rosin glycerin ester and (b) reacting said rosin glycerin ester with 1-decene.

19. The thermoplastic adhesive composition of claim 18 wherein said rosin is reacted with said glycerin in the presence of a catalyst.

20. The thermoplastic adhesive composition of claim 18 wherein said aliphatically modified rosin resin is a vacuum stripped rosin resin.

21. The thermoplastic adhesive composition of claim 18 wherein said metallocene catalyzed polyolefin is present in said thermoplastic adhesive composition in an amount of from about 40 to about 80 parts by weight and said aliphatically modified rosin resin is present in said thermoplastic adhesive composition in an amount of from about 20 to about 60 parts by weight.

* * * * *